US012597344B2

(12) United States Patent
Powers

(10) Patent No.: US 12,597,344 B2
(45) Date of Patent: Apr. 7, 2026

(54) EMERGENCY VEHICLE DETECTION DEVICE

(71) Applicant: Diane Powers, Helena, MT (US)

(72) Inventor: Diane Powers, Helena, MT (US)

( * ) Notice: Subject to any disclaimer, the term of this patent is extended or adjusted under 35 U.S.C. 154(b) by 39 days.

(21) Appl. No.: 18/625,336

(22) Filed: Apr. 3, 2024

(65) Prior Publication Data

US 2025/0316167 A1 Oct. 9, 2025

(51) Int. Cl.
*G08G 1/0962* (2006.01)
*G08G 1/04* (2006.01)

(52) U.S. Cl.
CPC ............. *G08G 1/0962* (2013.01); *G08G 1/04* (2013.01)

(58) Field of Classification Search
CPC ............................... G08G 1/0962; G08G 1/04
See application file for complete search history.

(56) References Cited

U.S. PATENT DOCUMENTS

| | | | | | |
|---|---|---|---|---|---|
| 3,710,313 | A * | 1/1973 | Kimball | G08G 1/094 | 340/904 |
| 3,873,963 | A * | 3/1975 | Neal | G08B 1/08 | 340/902 |
| 3,997,868 | A * | 12/1976 | Ribnick | G08G 1/0965 | 340/902 |
| 4,158,190 | A * | 6/1979 | Stefanov | G08G 1/0965 | 340/902 |
| 4,209,769 | A * | 6/1980 | Chronerberry | B60Q 9/008 | 340/902 |
| 4,212,085 | A * | 7/1980 | Vaillancour | G01S 3/8034 | 340/902 |
| 4,380,004 | A * | 4/1983 | Coats | G08B 1/08 | 340/902 |
| 4,587,522 | A * | 5/1986 | Warren | G08G 1/0965 | 375/328 |
| 4,806,931 | A * | 2/1989 | Nelson | G08G 1/087 | 367/199 |
| 4,864,297 | A * | 9/1989 | Shaw | G08G 1/087 | 340/925 |
| 4,952,931 | A * | 8/1990 | Serageldin | G08G 1/0965 | 340/901 |
| 5,029,216 | A | 7/1991 | Jhabvala | | |
| 5,235,329 | A * | 8/1993 | Jackson | G08G 1/0965 | 455/66.1 |
| 5,278,553 | A * | 1/1994 | Cornett | G08G 1/0965 | 340/904 |
| 5,287,411 | A * | 2/1994 | Hill | G01S 3/8036 | 340/902 |
| 5,495,242 | A * | 2/1996 | Kick | G08G 1/087 | 340/902 |

(Continued)

FOREIGN PATENT DOCUMENTS

WO WO2017151937 8/2017

*Primary Examiner* — Hoi C Lau

(57) ABSTRACT

An emergency vehicle detection device for visually alerting a driver of an automobile of a nearby emergency vehicle includes a housing, a processor, a sensor assembly, and an indicator. The processor is mounted in the housing and is operatively coupled to the sensor assembly. The sensor assembly is configured to detect an emergency vehicle nearby. The indicator is mounted on the housing and is operatively coupled to the processor. The processor is programmed to activate the indicator to emit an alert signal when the sensor assembly detects the emergency vehicle.

8 Claims, 6 Drawing Sheets

(56) References Cited

U.S. PATENT DOCUMENTS

| | | | | | |
|---|---|---|---|---|---|
| 5,808,560 | A * | 9/1998 | Mulanax | G08G 1/0965 | 340/7.62 |
| 5,825,304 | A * | 10/1998 | Marin | G08G 1/0965 | 340/902 |
| 5,894,279 | A * | 4/1999 | Rose | G08G 1/0965 | 340/904 |
| 5,926,112 | A * | 7/1999 | Hartzell | G08G 1/0965 | 340/904 |
| 5,959,551 | A * | 9/1999 | Cardillo | G08G 1/0965 | 340/902 |
| 6,011,321 | A * | 1/2000 | Stancu | B60R 25/04 | 340/426.21 |
| 6,087,961 | A * | 7/2000 | Markow | G08G 1/0965 | 340/902 |
| 6,362,749 | B1 * | 3/2002 | Brill | G08G 1/0965 | 340/904 |
| 6,895,332 | B2 * | 5/2005 | King | G08G 1/0965 | 701/457 |
| 6,917,306 | B2 * | 7/2005 | Lilja | G08G 1/0965 | 701/32.4 |
| 7,019,669 | B1 * | 3/2006 | Carr | G08G 1/164 | 340/917 |
| 7,042,345 | B2 * | 5/2006 | Ellis | G09B 21/006 | 340/436 |
| 7,099,774 | B2 * | 8/2006 | King | G01C 21/26 | 701/515 |
| 7,183,944 | B2 * | 2/2007 | Gutta | G08G 1/0965 | 348/148 |
| 7,265,665 | B2 * | 9/2007 | Bouchard | G08B 13/1427 | 340/539.11 |
| 7,271,736 | B2 * | 9/2007 | Siegel | G08G 1/0965 | 340/902 |
| 7,629,898 | B2 * | 12/2009 | Kirkpatrick | G08G 1/0965 | 340/902 |
| 7,663,504 | B2 * | 2/2010 | Votaw | G08G 1/161 | 340/902 |
| 7,872,593 | B1 * | 1/2011 | Rauscher | G06T 5/50 | 340/905 |
| 8,179,240 | B1 * | 5/2012 | Orefice | G08G 1/161 | 340/436 |
| 8,842,021 | B2 * | 9/2014 | Behm | G08G 1/0969 | 340/988 |
| 9,224,294 | B1 * | 12/2015 | St. John | G08G 1/0965 | |
| D766,765 | S | 9/2016 | Vandiver | | |
| 9,841,767 | B1 * | 12/2017 | Hayward | G01C 21/367 | |
| 9,878,656 | B2 * | 1/2018 | Gergets | F21V 23/04 | |
| 10,216,194 | B1 * | 2/2019 | Hayward | G05D 1/24 | |
| 10,236,018 | B2 * | 3/2019 | Moore | G08G 1/0965 | |
| 10,509,414 | B1 * | 12/2019 | Hayward | G08G 1/127 | |
| 10,762,777 | B2 * | 9/2020 | Aist | G08G 1/096716 | |
| 10,916,260 | B2 * | 2/2021 | Moore | H04R 3/005 | |
| 11,163,317 | B2 * | 11/2021 | Kelkar | G01S 5/0284 | |
| 11,244,564 | B2 * | 2/2022 | Seifert | G08G 1/0965 | |
| 11,341,753 | B2 * | 5/2022 | Asvatha Narayanan | G06V 20/584 | |
| 11,361,660 | B2 * | 6/2022 | Mondello | H04W 12/106 | |
| 11,364,910 | B1 * | 6/2022 | Schmitt | G01S 3/8083 | |
| 11,609,576 | B2 * | 3/2023 | Luo | G05D 1/0088 | |
| 11,721,144 | B2 * | 8/2023 | Salter | B60R 25/24 | 340/5.72 |
| 11,869,352 | B2 * | 1/2024 | Chodorski | H04W 4/90 | |
| 11,887,476 | B2 * | 1/2024 | Chien | G08G 1/096775 | |
| 11,899,468 | B2 * | 2/2024 | Cull | B60W 30/095 | |
| 11,984,026 | B2 * | 5/2024 | Newland | G06V 10/60 | |
| 11,990,039 | B2 * | 5/2024 | Fesler | G08G 1/0965 | |
| 12,062,284 | B2 * | 8/2024 | Sase | B60K 35/00 | |
| 12,087,161 | B1 * | 9/2024 | Deyaf | G08G 1/0965 | |
| 12,223,832 | B2 * | 2/2025 | Newland | G06V 10/60 | |
| 2001/0038344 | A1 * | 11/2001 | Garcia | G08G 1/0965 | 340/904 |
| 2002/0102961 | A1 * | 8/2002 | Gibbons | G08G 1/0965 | 455/70 |
| 2002/0186201 | A1 * | 12/2002 | Gutta | G08G 1/0965 | 345/173 |
| 2003/0098801 | A1 * | 5/2003 | Martin | G08G 1/0965 | 340/902 |
| 2003/0151663 | A1 * | 8/2003 | Lorenzetti | H04N 7/18 | 348/148 |
| 2003/0154017 | A1 * | 8/2003 | Ellis | A61H 3/068 | 701/422 |
| 2004/0083035 | A1 * | 4/2004 | Ellis | A61H 3/068 | 701/1 |
| 2004/0143390 | A1 * | 7/2004 | King | G01C 21/26 | 340/988 |
| 2004/0143391 | A1 * | 7/2004 | King | G08G 1/0965 | 701/468 |
| 2004/0145496 | A1 * | 7/2004 | Ellis | G09B 21/006 | 340/905 |
| 2004/0155795 | A1 * | 8/2004 | Quintana | G08G 1/0965 | 340/902 |
| 2004/0246144 | A1 * | 12/2004 | Siegel | G08G 1/0965 | 340/902 |
| 2005/0093717 | A1 * | 5/2005 | Lilja | G08G 1/0965 | 340/902 |
| 2005/0278078 | A1 * | 12/2005 | Sterling | G08G 1/0965 | 701/1 |
| 2006/0055521 | A1 * | 3/2006 | Blanco | H04N 7/188 | 348/148 |
| 2007/0005245 | A1 * | 1/2007 | Ellis | G09B 21/006 | 701/469 |
| 2008/0303660 | A1 * | 12/2008 | Lombardi | G08G 1/0965 | 340/540 |
| 2009/0005988 | A1 * | 1/2009 | Sterling | G08G 1/0965 | 701/301 |
| 2012/0136559 | A1 * | 5/2012 | Rothschild | G08G 1/096741 | 348/148 |
| 2012/0313792 | A1 * | 12/2012 | Behm | G08G 1/0962 | 340/902 |
| 2013/0194087 | A1 * | 8/2013 | Tomer | H04M 11/04 | 340/436 |
| 2014/0227991 | A1 * | 8/2014 | Breton | G08G 1/0965 | 455/404.2 |
| 2015/0070195 | A1 * | 3/2015 | Gaines | G08G 1/096783 | 340/932 |
| 2015/0213713 | A1 * | 7/2015 | Taylor | G08G 1/0125 | 340/906 |
| 2016/0009222 | A1 * | 1/2016 | Taylor | G08G 1/0965 | 340/902 |
| 2018/0211528 | A1 * | 7/2018 | Seifert | H04R 1/406 | |
| 2018/0261237 | A1 * | 9/2018 | Moore | G01S 3/8083 | |
| 2019/0172478 | A1 * | 6/2019 | Moore | G01S 3/8083 | |
| 2019/0355247 | A1 * | 11/2019 | Aist | G08G 1/164 | |
| 2020/0042017 | A1 * | 2/2020 | Kelkar | G08G 1/22 | |
| 2020/0110949 | A1 * | 4/2020 | Asvatha Narayanan | G08G 1/0965 | |
| 2020/0312136 | A1 * | 10/2020 | Mondello | H04L 9/3242 | |
| 2020/0349380 | A1 * | 11/2020 | Alakarhu | G06V 20/62 | |
| 2021/0101483 | A1 * | 4/2021 | Okezie | B60K 28/10 | |
| 2021/0183245 | A1 * | 6/2021 | Ramirez | G08G 1/0965 | |
| 2021/0188261 | A1 * | 6/2021 | Song | B60W 40/105 | |
| 2022/0012988 | A1 * | 1/2022 | Avadhanam | G08B 21/22 | |
| 2022/0277650 | A1 * | 9/2022 | Mondello | G08G 1/096725 | |
| 2022/0309918 | A1 * | 9/2022 | Sase | G08G 1/09675 | |
| 2022/0351619 | A1 * | 11/2022 | Amer | G08G 1/0965 | |
| 2023/0306844 | A1 * | 9/2023 | Fesler | B60K 35/21 | |
| 2023/0343214 | A1 * | 10/2023 | Abbaspour | G06F 18/2415 | |
| 2023/0377459 | A1 * | 11/2023 | Newland | G08G 1/166 | |
| 2024/0296735 | A1 * | 9/2024 | Newland | H04R 1/20 | |
| 2025/0171020 | A1 * | 5/2025 | Chandra Shekar | G08G 1/0129 | |
| 2025/0187635 | A1 * | 6/2025 | Parasuram | B60W 30/0956 | |
| 2025/0200245 | A1 * | 6/2025 | Cao | G06F 30/20 | |

* cited by examiner

EMERGENCY VEHICLE DETECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to emergency vehicle detection devices and more particularly pertains to a new emergency vehicle detection device for visually alerting a driver of an automobile of a nearby emergency vehicle.

(2) Description of Related Art Including Information Disclosed Under 37 CFR 1.97 and 1.98

The prior art discloses various emergency vehicle detection devices which provide visual or aural warnings to a driver when an emergency vehicle is nearby. However, the prior art fails to describe such an apparatus which is positionable on a dashboard of an automobile or such an apparatus which uses a camera to identify a presence of an emergency vehicle nearby.

BRIEF SUMMARY OF THE INVENTION

An embodiment of the disclosure meets the needs presented above by generally comprising a housing, a processor, a sensor assembly, and an indicator. The processor is mounted in the housing and is operatively coupled to the sensor assembly. The sensor assembly is configured to detect an emergency vehicle nearby. The indicator is mounted on the housing and is operatively coupled to the processor. The processor is programmed to activate the indicator to emit an alert signal when the sensor assembly detects the emergency vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
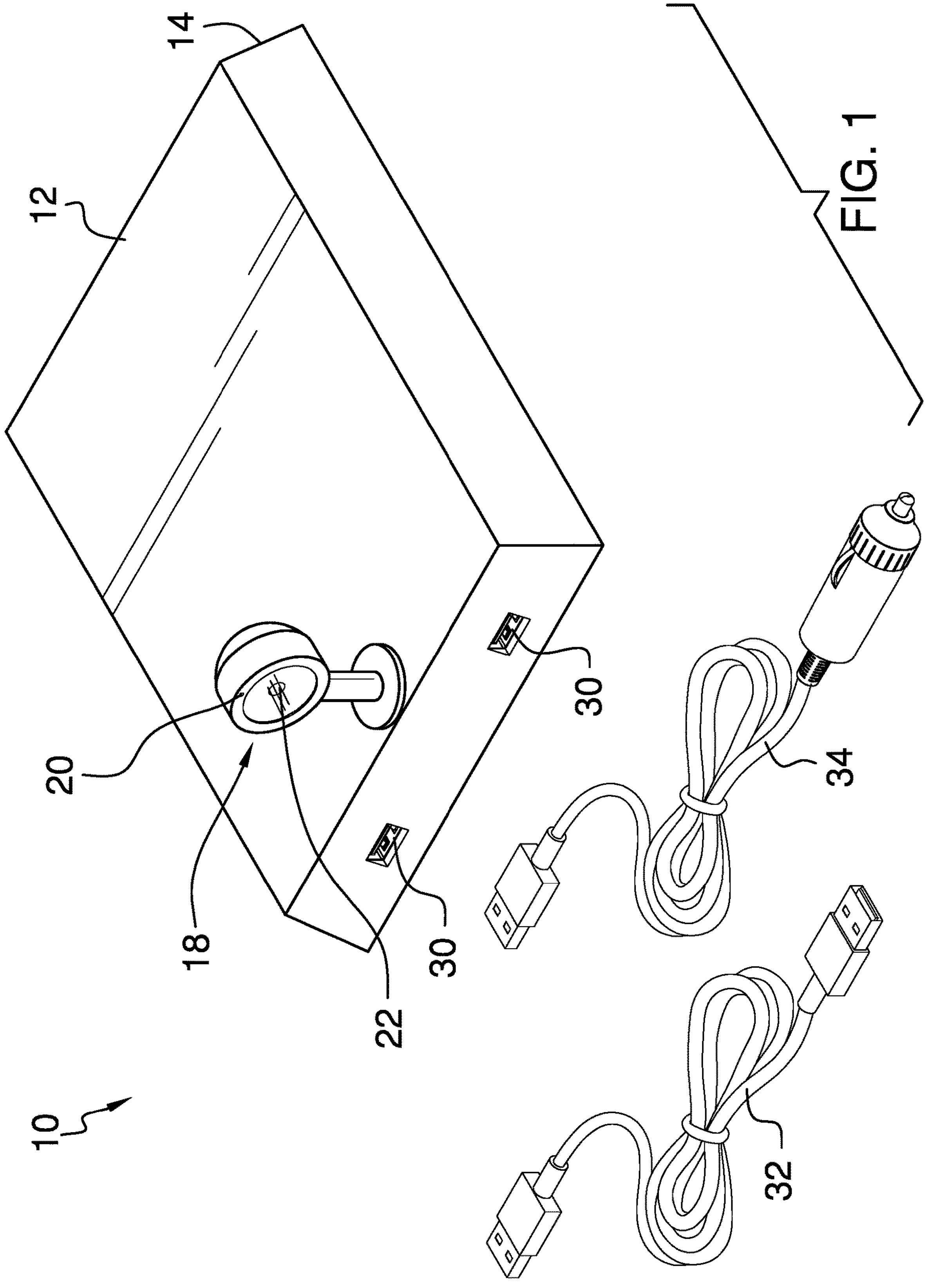
FIG. 1 is a perspective view of an emergency vehicle detection device according to an embodiment of the disclosure.
Figure 2:
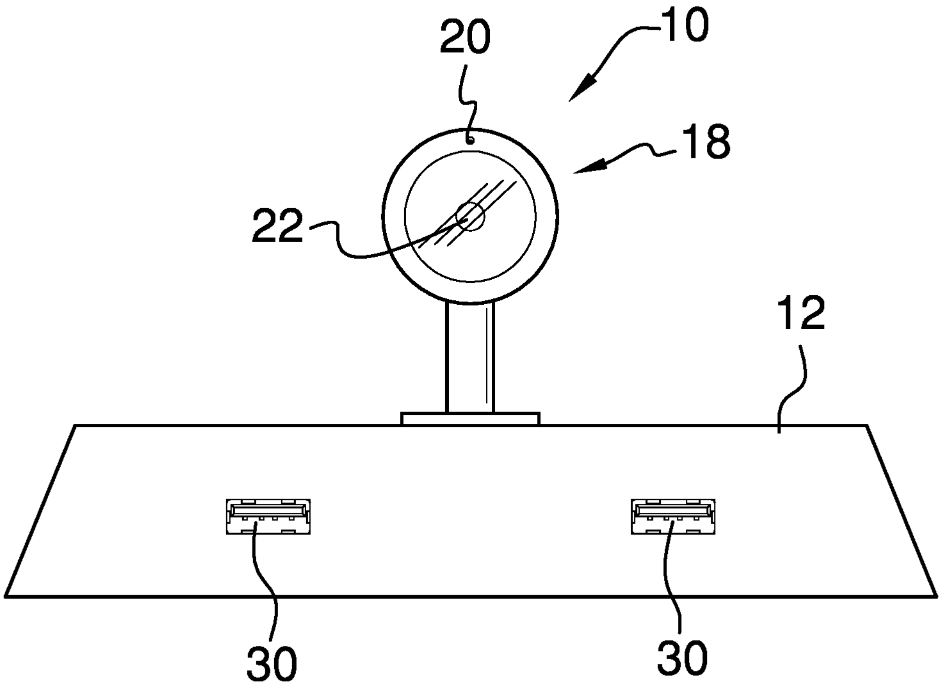
FIG. 2 is a front view of an embodiment of the disclosure.
Figure 3:
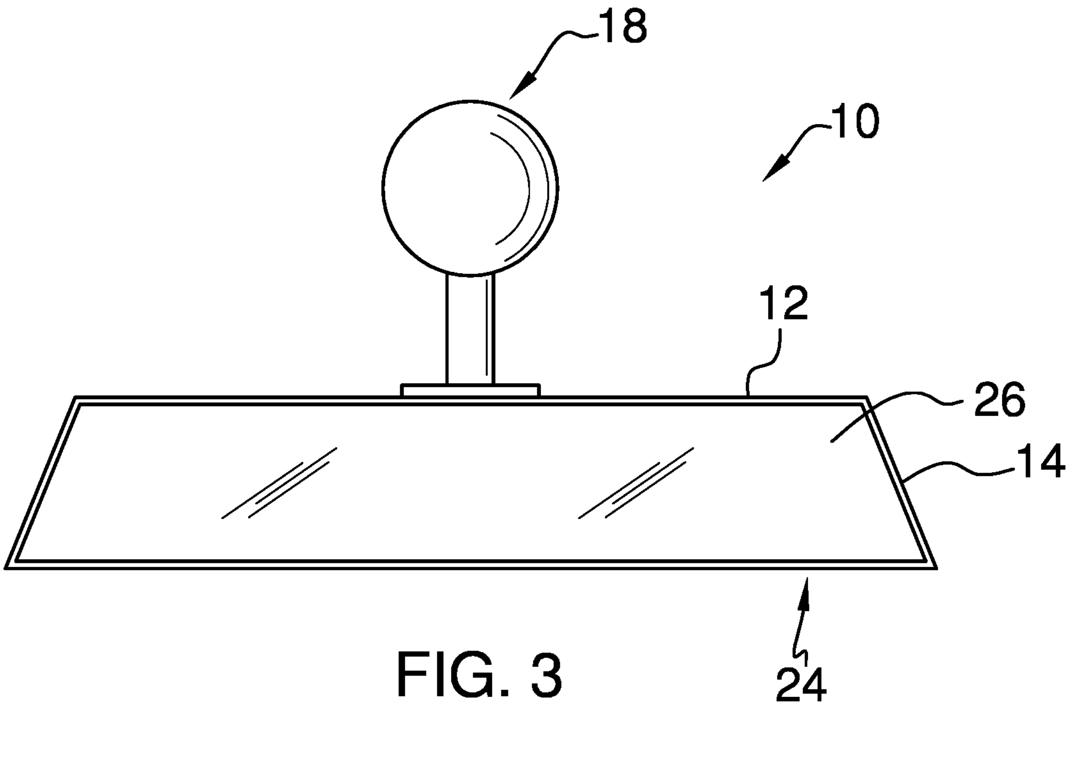
FIG. 3 is a rear view of an embodiment of the disclosure.
Figure 4:
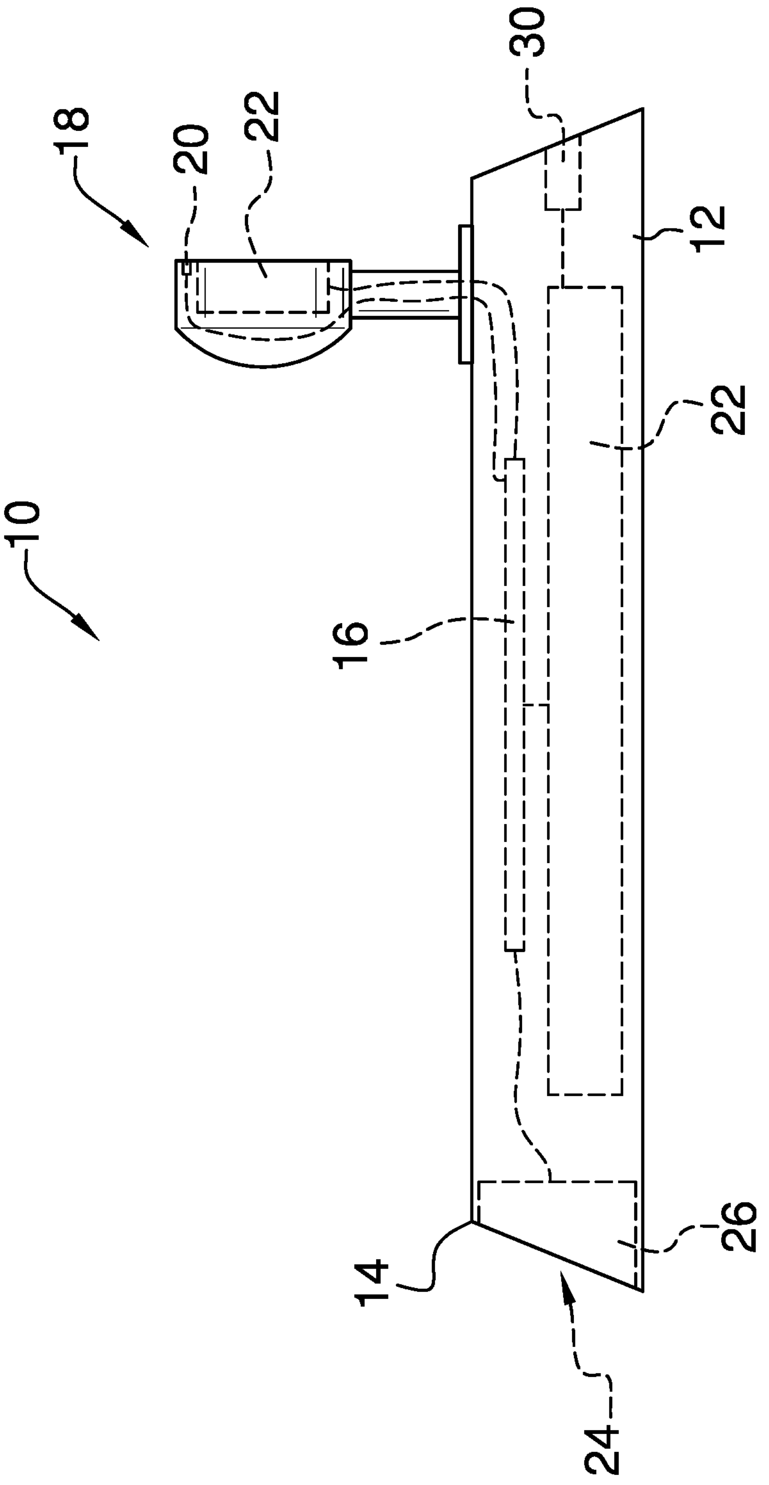
FIG. 4 is a side view of an embodiment of the disclosure.
Figure 5:
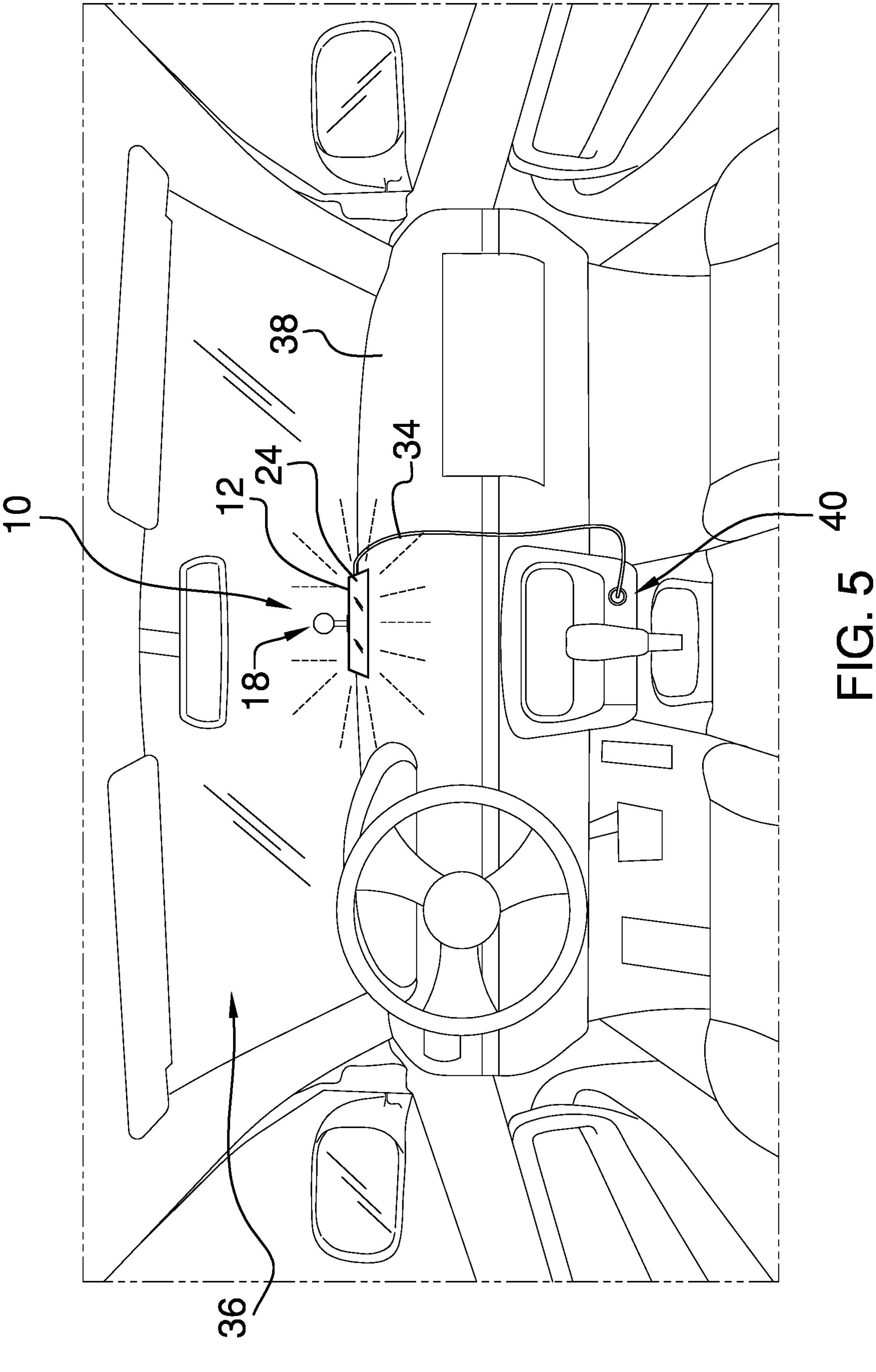
FIG. 5 is an in-use view of an embodiment of the disclosure.
Figure 6:
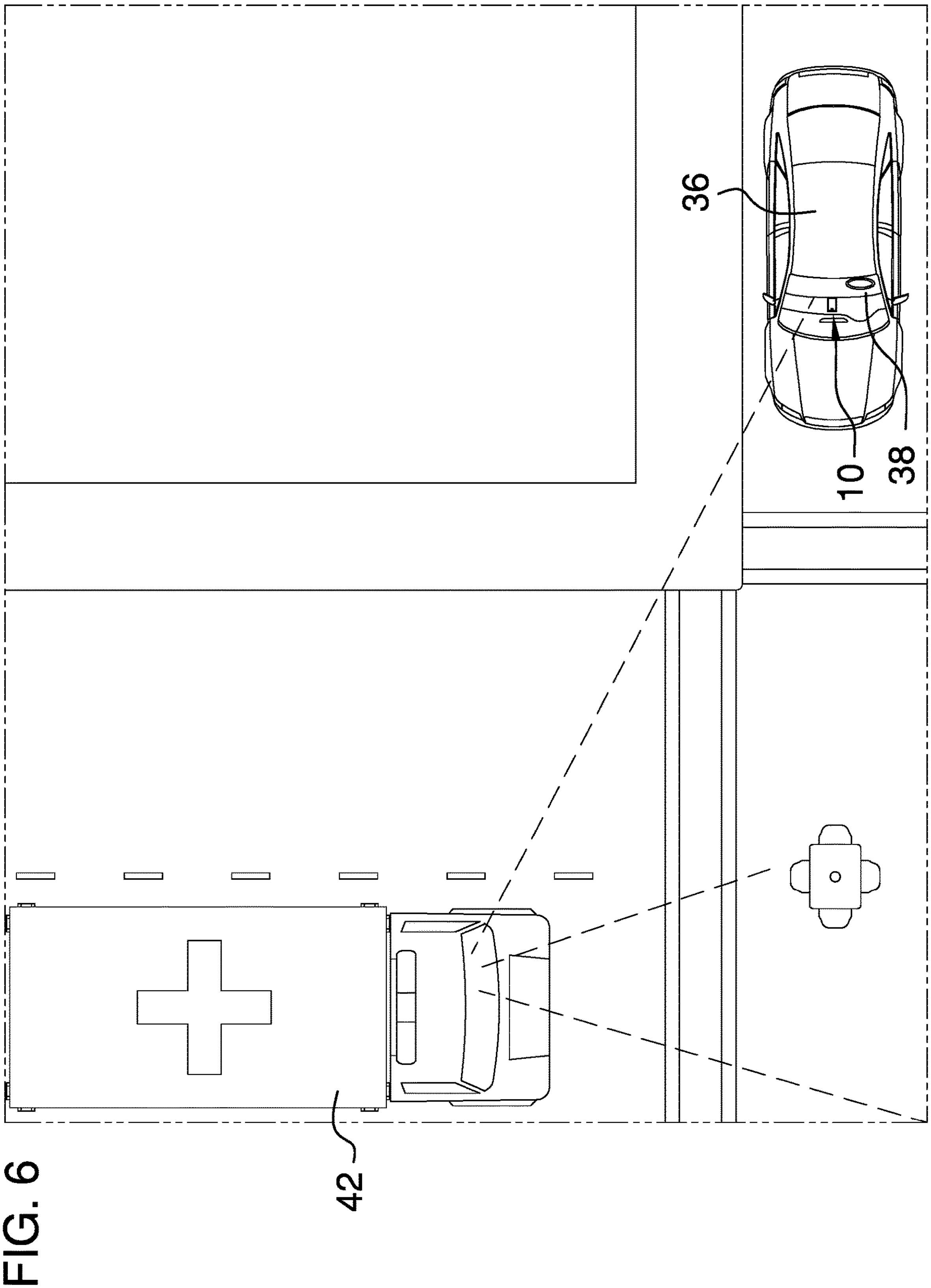
FIG. 6 is a an in-use view of an embodiment of the disclosure.
Figure 7:
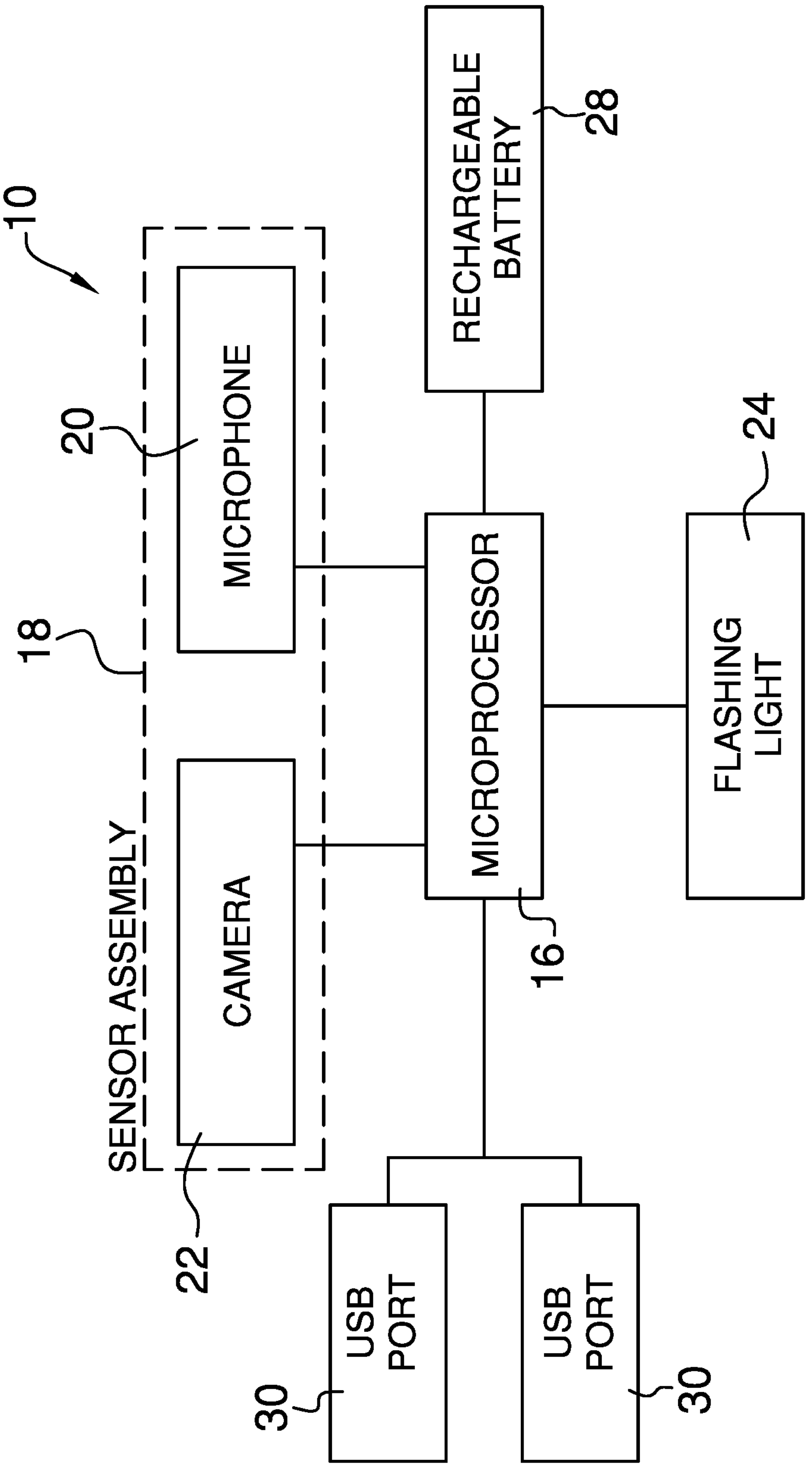
FIG. 7 is a block diagram of an embodiment of the disclosure.

With reference now to the drawings, and in particular to FIGS. 1 through 7 thereof, a new emergency vehicle detection device embodying the principles and concepts of an embodiment of the disclosure and generally designated by the reference numeral 10 will be described.

As best illustrated in FIGS. 1 through 7, the emergency vehicle detection device 10 generally comprises a housing 12 which is sized and configured to rest on a dashboard 38 of an automobile 36. A processor 16 is mounted in the housing 12, and a sensor assembly 18 is operatively coupled to the processor 16. The sensor assembly 18 is configured to detect an emergency vehicle 42 such as an ambulance, a firetruck, a police cruiser, or the like. The sensor assembly 18 comprises a microphone 20 and a camera 22. The processor 16 is programmed to analyze audio captured by the microphone 20 to detect an audible siren corresponding to the emergency vehicle 42 and to analyze images captured by the camera 22 to determine a presence of the emergency vehicle 42. The camera 22 is mounted atop the housing 12 and is oriented to face forwardly with respect to the housing 12. The microphone 20 is positioned adjacent to the camera 22. In some embodiments, the sensor assembly 18 may have a transceiver for detecting radio or other wireless signals emitted by the emergency vehicle 42.

An indicator 24 is mounted on a rear side 14 of the housing 12 and is operatively coupled to the processor 16. The processor 16 is programmed to activate the indicator 24 to emit an alert signal when the sensor assembly 18 detects the emergency vehicle 42. The indicator 24 comprises a light source 26, and the alert signal comprises a light emitted by the light source 26. In other embodiments, the indicator 24 may display a flag or other visual indication signifying the alert signal. The processor 16 may be programmed to activate the indicator 24 only when the processor 16 detects via the sensor assembly 18 that the emergency vehicle 42 is exhibiting signs of operating during an emergency. Such signs may include operating emergency lights on the emergency vehicle 42, operating the alert siren, emitting an emergency radio signal, and the like.

A power supply 28 is electrically coupled to the processor 16 and is positioned in the housing 12. The power supply 28 comprises a battery but may comprise a capacitor or other suitable power storage. A pair of charging ports 30 is mounted on the housing 12 and is electrically coupled to the power supply 28. The charging ports 30 are configured to electrically couple to an external power source to charge the power supply 28. For example, the charging ports 30 may electrically couple to an electrical port 40 in the automobile 36. With reference to FIG. 1, the charging ports 30 are depicted as being universal serial bus (USB) ports, but any suitable electrical port may be used. FIG. 1 also shows a pair of charging cords which may be used to charge the power supply 28, including a USB-to-USB cord 32 and a USB-to-auxiliary power outlet cord 34. The exact plugs used for such a charging cord may vary depending on the types of ports used on the emergency vehicle 42 detection device 10 and the automobile 36.

In use, the emergency vehicle 42 detection device 10 is placed on the dashboard 38 of the automobile 36 or other suitable location to detect the presence of the emergency vehicle 42 near the automobile 36. When the processor 16 detects via the sensor assembly 18 the presence of the emergency vehicle 42, the processor 16 activates the indicator 24 to alert a driver of the automobile 36 to the presence of the emergency vehicle 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency vehicle detection device comprising:

a housing, wherein the housing is sized and configured to rest on a dashboard of an automobile, the housing having a rear side being planar and angled such that the back face of the housing extends upwardly and towards a front side of the housing from a bottom edge of the back face;

a processor mounted in the housing;

a sensor assembly operatively coupled to the processor, the sensor assembly being configured to detect an emergency vehicle; and an indicator mounted on the housing and operatively coupled to the processor, the processor being programmed to activate the indicator to emit an alert signal when the sensor assembly detects the emergency vehicle, wherein the indicator comprises a light source, the alert signal comprising a light emitted by the light source, the indicator being positioned on the rear side of the housing, the light source having a planar face flush with the back face of the housing.

2. The device of claim 1, wherein the sensor assembly comprises a microphone, the processor being programmed to analyze audio captured by the microphone to detect an audible siren corresponding to the emergency vehicle.

3. The device of claim 1, wherein the sensor assembly comprises a camera, the processor being programmed to analyze images captured by the camera to determine a presence of the emergency vehicle.

4. The device of claim 3, wherein the camera is mounted to the housing and is oriented to face forwardly with respect to the housing.

5. The device of claim 1, further comprising a power supply electrically coupled to the processor and positioned in the housing.

6. The device of claim 5, wherein the power supply comprises a battery.

7. The device of claim 5, further comprising a charging port mounted on the housing and electrically coupled to the power supply, the charging port being configured to electrically couple to an external power source to charge the power supply.

8. An emergency vehicle detection device comprising:

a housing, the housing being sized and configured to rest on a dashboard of an automobile, the housing having a rear side being planar and angled such that the back face of the housing extends upwardly and towards a front side of the housing from a bottom edge of the back face;

a processor mounted in the housing;

a sensor assembly operatively coupled to the processor, the sensor assembly being configured to detect an emergency vehicle, the sensor assembly comprising:

a microphone, the processor being programmed to analyze audio captured by the microphone to detect an audible siren corresponding to the emergency vehicle; and a camera, the processor being programmed to analyze images captured by the camera to determine a presence of the emergency vehicle, the camera mounted to the housing and oriented to face forwardly with respect to the housing;

an indicator mounted on the housing and operatively coupled to the processor, the processor being programmed to activate the indicator to emit an alert signal when the sensor assembly detects the emergency vehicle, the indicator comprising a light source, the alert signal comprising a light emitted by the light source, the indicator being positioned on a rear side of the housing, the light source having a planar face flush with the back face of the housing;

a power supply electrically coupled to the processor and positioned in the housing, the power supply comprising a battery; and a charging port mounted on the housing and electrically coupled to the power supply, the charging port being configured to electrically couple to an external power source to charge the power supply.

* * * * *